(12) United States Patent
Maier et al.

(10) Patent No.: US 10,173,578 B2
(45) Date of Patent: Jan. 8, 2019

(54) SECURING DEVICE FOR AN OPTICAL BODY FOR A MOTOR VEHICLE HEADLIGHT

(71) Applicant: ZIZALA LICHTSYSTEME GMBH, Wieselburg (AT)

(72) Inventors: Udo Maier, Herzogenburg (AT); Oliver Reitegger, Groebming (AT); Lukas Taudt, Ferschnitz (AT)

(73) Assignee: ZKW GROUP GMBH, Wieselburg (AT)

( * ) Notice: Subject to any disclaimer, the term of this patent is extended or adjusted under 35 U.S.C. 154(b) by 154 days.

(21) Appl. No.: 15/032,208

(22) PCT Filed: Oct. 15, 2014

(86) PCT No.: PCT/AT2014/050248
§ 371 (c)(1),
(2) Date: Apr. 26, 2016

(87) PCT Pub. No.: WO2015/061819
PCT Pub. Date: May 7, 2015

(65) Prior Publication Data
US 2016/0273730 A1     Sep. 22, 2016

(30) Foreign Application Priority Data

Oct. 28, 2013   (AT) .............................. A 50702/2013

(51) Int. Cl.
*B60Q 1/04*      (2006.01)
*F21S 41/143*    (2018.01)
(Continued)

(52) U.S. Cl.
CPC ......... *B60Q 1/0491* (2013.01); *B60Q 1/0408* (2013.01); *F21S 41/143* (2018.01);
(Continued)

(58) Field of Classification Search
CPC .... F21S 48/17; F21S 48/1154; F21S 48/1208; F21S 48/1241; F21S 48/1747;
(Continued)

(56) References Cited

U.S. PATENT DOCUMENTS

2004/0041984 A1    3/2004  Tani et al.
2008/0253144 A1*  10/2008  Dolson ................ B60Q 1/0041
                                                          362/547
(Continued)

FOREIGN PATENT DOCUMENTS

DE    102007038786 A1   2/2009
EP      2085680 A1      8/2009

OTHER PUBLICATIONS

International Search Report for PCT/AT2014/050248 dated Jan. 28, 2015.

*Primary Examiner* — Diane I Lee
*Assistant Examiner* — Naomi M Wolford
(74) *Attorney, Agent, or Firm* — Eversheds Sutherland (US) LLP

(57) ABSTRACT

The invention relates to a mounting device (100) for an optical body (1) for a motor vehicle headlight or for a light module for a motor vehicle headlight, which optical body (1) has a number of adjacently arranged ancillary optical systems (11, 12, 13, 14, 15), wherein each ancillary optical system (11-15) is formed from a light-guiding material and each ancillary optical system (11-15) has a light coupling-in face (11a-15a) and a light decoupling face (11b-15b), wherein the ancillary optical systems (11-15) are mechanically interconnected in the region of the light decoupling faces (11b-15b) by at least one connecting web (21, 22) extending transversely to the ancillary optical systems (11-15), wherein the at least one connecting web (21, 22) is optically ineffective at least in regions, wherein the mounting device has a main body (101) having receptacles (121, (Continued)

Figure 3:
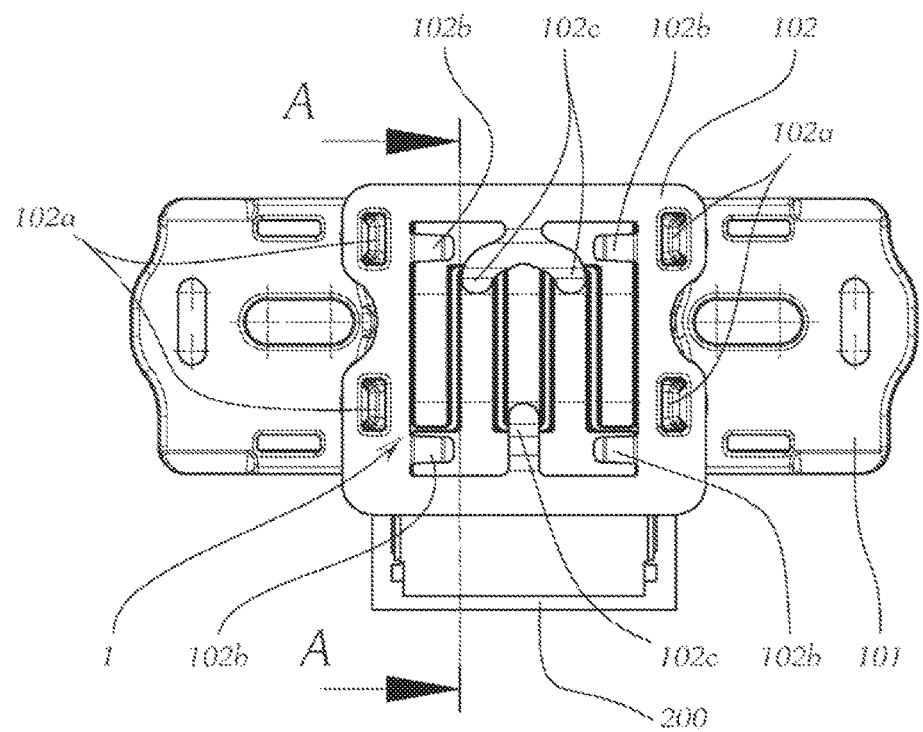

122) for the optical body (1), and a retaining body (102), which holds the optical body in the main body by means of camping elements (102b, 102c).

22 Claims, 3 Drawing Sheets

(51) Int. Cl.
*F21S 41/29* (2018.01)
*F21S 41/24* (2018.01)
*F21S 41/60* (2018.01)
*F21S 41/663* (2018.01)

(52) U.S. Cl.
CPC ............... *F21S 41/24* (2018.01); *F21S 41/29* (2018.01); *F21S 41/60* (2018.01); *F21S 41/663* (2018.01)

(58) Field of Classification Search
CPC ........ F21S 41/24; F21S 41/663; F21S 41/143; F21S 41/29; F21S 41/60; B60Q 1/0408; B60Q 1/0491
See application file for complete search history.

(56) References Cited

U.S. PATENT DOCUMENTS

| 2009/0016074 A1* | 1/2009 | Dolson ................. F21K 9/00 362/555 |
| 2012/0147608 A1 | 6/2012 | Kawagoe et al. |
| 2014/0169014 A1 | 6/2014 | Jungwirth et al. |

\* cited by examiner

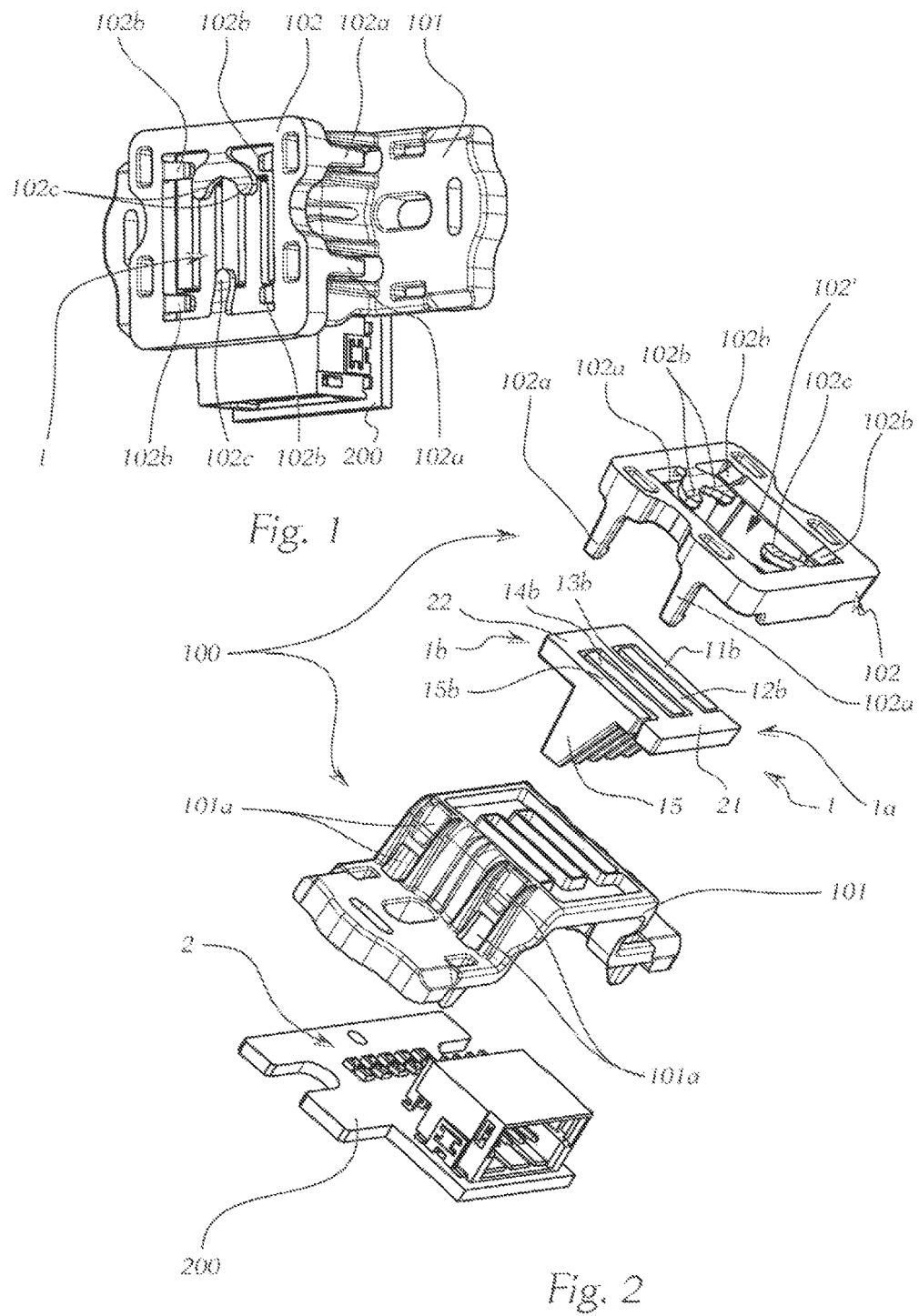

SECURING DEVICE FOR AN OPTICAL BODY FOR A MOTOR VEHICLE HEADLIGHT

The invention relates to a mounting device for an optical body for a motor vehicle headlight or for a light module for a motor vehicle headlight, which optical body has a number of adjacently arranged ancillary optical systems, wherein each ancillary optical system is formed from a light-guiding material and each ancillary optical system has a light coupling-in face and a light decoupling face, wherein the ancillary optical systems are mechanically interconnected in the region of the light decoupling faces by at least one connecting web extending transversely to the ancillary optical systems, wherein the at least one connecting web is optically ineffective at least in regions.

The invention also relates to a light module for a motor vehicle headlight, which light module comprises at least one optical body, which has at least a number of adjacently arranged ancillary optical systems, wherein each ancillary optical system is formed from a light-guiding material and each ancillary optical system has a light coupling-in face and a light decoupling face, wherein the ancillary optical systems are mechanically interconnected in the region of the light decoupling faces by at least one connecting web extending transversely to the ancillary optical systems, wherein the least one connecting web is optically ineffective at least in regions.

In addition, the invention also relates to a motor vehicle headlight comprising one or more light modules of this type.

In particular, the invention relates to a motor vehicle headlight of this type for generating a dynamic light distribution.

Optical bodies as mentioned in the introduction are used in light modules for motor vehicle headlights in order to generate light distributions, for example to generate segmented light distributions, i.e. light distributions which are constructed from individual light segments. The ancillary optical systems are generally manufactured from plastic, silicone, glass, etc. In order to meet the requirements in terms of light, i.e. in particular the legal stipulations and the stipulations of car manufacturers, and also in order to withstand the mechanical stresses for as long as possible, preferably over the service life of the vehicle, it is necessary for the optical bodies to be fixed accurately and in a stable manner in this desired position.

For fastening, it is known to produce a silicone optical body and plastic mount in a two-component injection-moulding process. By melting the plastic mount onto the optical body, however, there is a partial loss of the fully reflective properties of the optical body (i.e. of the ancillary optical systems of the optical body).

The object of the invention is to create a mounting device for an optical body with which these problems are overcome and which allows ancillary optical systems to be fixed in a simple, economical, stable and accurately positioned manner.

This object is achieved with a mounting device of the type mentioned in the introduction in that, in accordance with the invention, the mounting device comprises a main body, which can be connected to a support for one or more light sources for feeding light into the optical body, wherein the main body has at least one receptacle for the ancillary optical systems, and wherein the main body also has at least one stop region, against which the optical body can be brought to rest via a rear face of the at least one connecting web when the ancillary optical systems are inserted into the at least one receptacle, and wherein the mounting device also has a retaining body, which can be applied to the main body following introduction of the optical body into the main body in the direction of introduction of the optical body, wherein a fastening device is provided, by means of which the retaining body can be fixed to the main body, and wherein the retaining body has at least one, preferably precisely one opening, such that light can exit unhindered from the light decoupling faces of the ancillary optical systems, and wherein the retaining body has clamping elements which, when the retaining body is fastened to the main body, come to rest against the at least one connecting web at the front face thereof, and/or the retaining body has clamping elements which, when the retaining body is fastened to the main body, come to rest against one or more light decoupling faces and/or in a region of one or more light decoupling faces of the one or more ancillary optical systems, and the clamping elements press the optical body against the at least one stop region of the main body.

With the retaining device according to the invention, the optical body can be held in position in a stable manner by means of the retaining body following the insertion into the main body. Here, from its front face, the optical body is pressed against the main body by the retaining body, such that the optical body is secured against a displacement in and against the light exit direction. By means of a suitable selection of the points of engagement of the clamping elements with the optical body at optically ineffective regions, the optical function of the optical body and therefore of the light module is not impaired either.

Here, the clamping elements are expediently elastic, in particular spring-loaded.

In accordance with a specific embodiment of the invention the at least one stop region and clamping elements rest against regions of the rear and front face(s), respectively, of the at least one connecting web that delimit an optically ineffective region of the at least one connecting web.

Here, the entire at least one connecting web is preferably optically ineffective.

In principle, the connecting web and the ancillary optical systems can be manufactured from different materials, such that the connecting web or connecting webs is/are manufactured from an optically ineffective material, for example from a non-transparent material, and therefore does/do not contribute to the optical function of the optical body. However, connecting web(s) and ancillary optical systems are usually manufactured from one material, generally even integrally (see the explanations in this regard further below), such that the connecting web or connecting webs also consists/consist from a light-guiding material. By means of a suitable selection of the position of a connecting web, for example such that this is arranged at a sufficient distance from the light exit faces of the ancillary optical systems, it can be provided that only a little light or no light passes into the connecting web or only into a region directly adjoining the light decoupling face(s), such that no light (or only an irrelevant amount) exits from the connecting web or exits only from a small region, such that the connecting web is completely or largely optically ineffective, i.e. does not contribute to the light distribution and also does not generate any negative optical effects, such as scattered light for example.

In accordance with an embodiment two connecting webs are provided, preferably one in an upper and one in a lower region of the optical element in the installed position.

Two connecting webs allow either manufacture of a particularly stable optical body, or the optical body can be divided into two components, such that it can be manufactured much more easily.

In order to reliably ensure that the connecting web or connecting webs is/are contacted only in an optically ineffective region, clamping elements which, when the retaining body is fastened to the main body, come to rest against the at least one connecting web at the front face thereof advantageously come to rest in at least one outer region in respect of a longitudinal extension of the connecting web, preferably in both outer regions.

The "longitudinal extension" in the installed position extends here typically transversely, i.e. in the horizontal direction.

In particular, in the case of two connecting webs, a clamping element comes to rest against each outer region of a connecting web.

In accordance with a typical application the light decoupling faces of adjacent ancillary optical systems are arranged at a distance a>0 from one another.

For manufacturing reasons it may be particularly advantageous if—as already mentioned briefly above—the optical element consists of at least two separate optical components, wherein each optical component comprises at least one light-guiding body.

It is particularly preferred if the optical element consists of precisely two optical components.

Here, in particular, at least one, preferably all optical components may comprise two or more light-guiding bodies.

Is also favourable if those clamping elements which, when the retaining body is fastened to the main body, come to rest against a light decoupling face come to rest in a region of the light decoupling face bordering a transverse web.

Here, it is in particular advantageous if one or more ancillary optical systems have webs which extend the light decoupling faces of the one or more ancillary optical systems.

Here, each ancillary optical system preferably has at least one web, which web connects the ancillary optical system to the at least one assigned connecting web.

Each ancillary optical system preferably has at least one web, which web is arranged in a region of the light decoupling face facing away from the connecting web connecting the ancillary optical system to other ancillary optical systems.

In particular in the case of two-part or multi-part optical bodies, this allows the individual components of the optical body to be held uniformly and in a stable manner, since the individual component parts which "form" the optical body are then held in regions facing away from one another.

A two-part or multi-part optical body is to be understood here in terms of its function as "an" optical body generating a defined light distribution. An optical body of this type, however, actually consists of two or more parts, which are arranged in fixed, defined positions relative to one another by means of the retaining device, such that the function of "an" optical body is provided.

It may also be expedient if those clamping elements which, when the retaining body is fastened to the main body, come to rest in a region of one or more light decoupling faces of the one or more ancillary optical systems come to rest against a web extending the light decoupling face of an ancillary optical system.

These webs may already be optically ineffective at least in part, such that these webs are well suited for contacting the clamping elements.

In particular, it is advantageous in this context if the clamping elements come to rest in a region of the web facing away from the corresponding light decoupling face. Regions of the web that are arranged further away are reliably optically ineffective, and therefore an abutment of the clamping elements there is not critical.

It is particularly advantageous when the clamping elements come to rest against webs, which webs form an open end of the ancillary optical system. The clamping elements therefore coming to rest against those webs which do not transition into a connecting web, i.e. at the free ends in the case of two-part or multi-part optical bodies.

Lastly, the fastening device also comprises detent elements and corresponding detent recesses, wherein detent elements are arranged on the retaining body and/or the main body and corresponding detent recesses are arranged on the main body and/or the retaining body. In this way, the main body and retaining body can be fastened to one another in a stable manner, such that the ancillary optical system is also held in a stable manner in the desired position.

In a preferred embodiment of the invention the main body additionally has at least one receptacle for each ancillary optical system. These receptacles lie in a front region and finish more or less in a planar manner with the light decoupling faces. It may also be, in some circumstances, that one or more further receptacles is/are also provided in a rear region for each ancillary optical system in order to generate an even more stable hold.

The optical body or the separate components forming the optical body are pressed against the main body by the retaining element, such that a movement in or against the light exit direction is no longer possible. The pressing force may be sufficiently high here that a lateral (i.e. horizontally, normal to the light exit direction) and a vertical displacement are also prevented.

Should the pressing force be insufficient, or in order to provide additional security against a lateral and/or vertical displacement of the optical body, the receptacles in the installed position may additionally also form a stop for the ancillary optical systems on one side or preferably on both sides and/or upwardly and/or downwardly.

In this respect, the at least one stop region of the main body may alternatively or additionally also be delimited on one or preferably both sides and/or in an upper and/or in a lower region by delimiting walls protruding in the light exit direction beyond the at least one stop region.

These delimiting walls, which surround the stop region(s), serve as a stop for the optical body upwardly and downwardly. A function as a stop region laterally is also possible.

However, a lateral displacement is usually prevented by the receptacles for the ancillary optical systems.

The object mentioned in the introduction is also achieved by a light module of the above-mentioned type, with which, in accordance with the invention, a mounting device according to the invention is provided in order to support the optical body in relation to one or more light sources.

Figure 4:
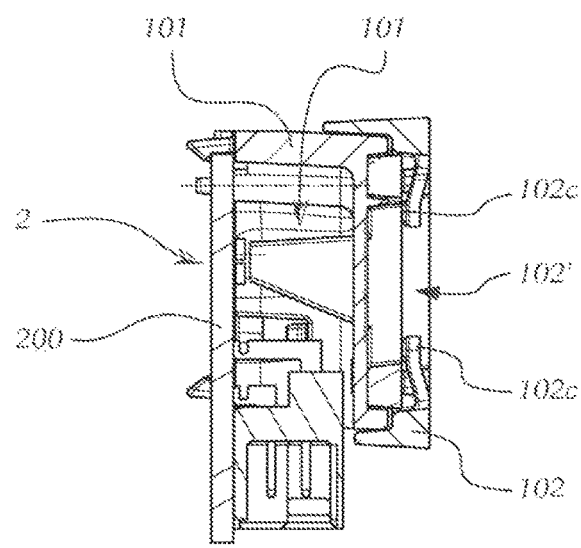
Figure 5:
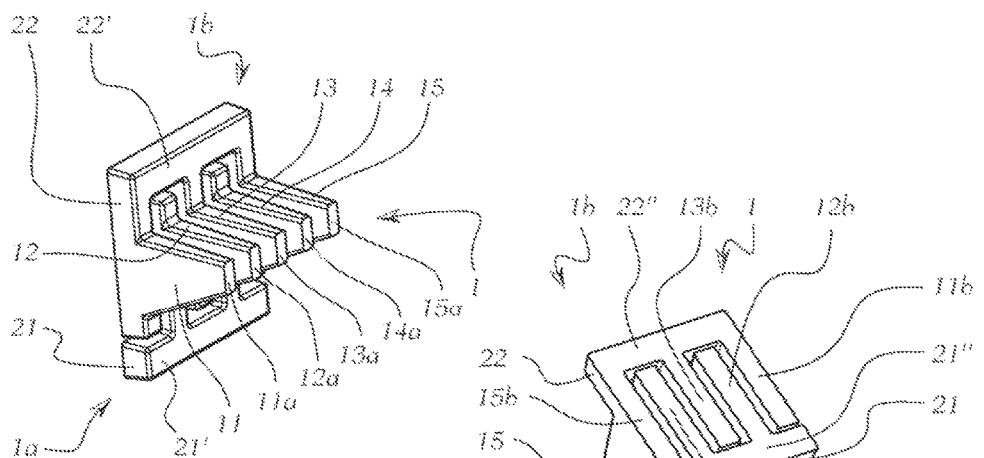
Figure 6:
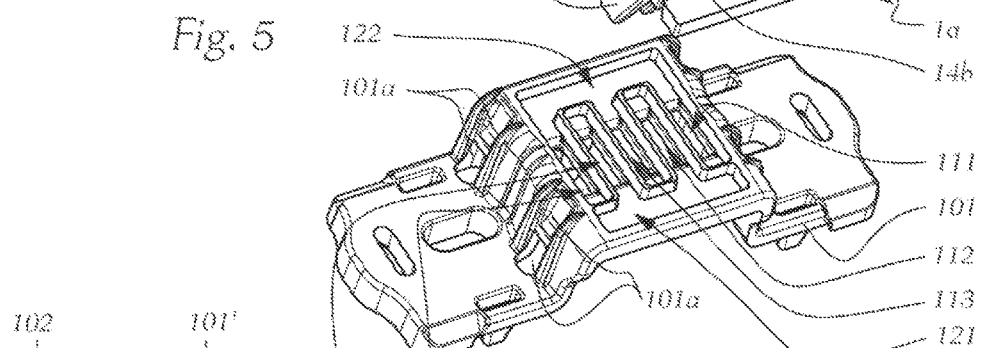
Figure 7:
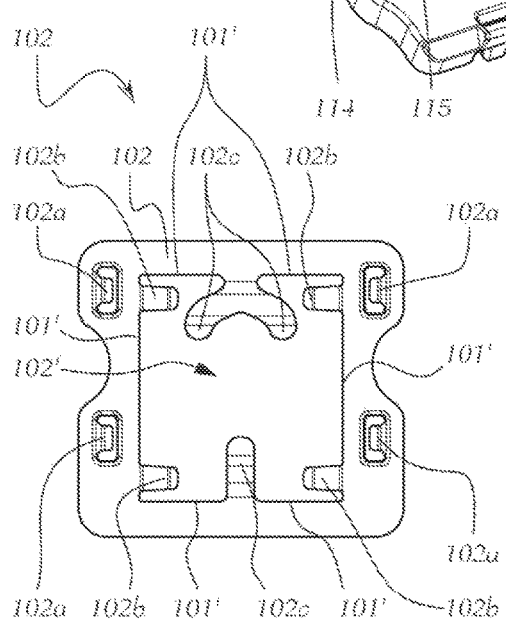
Figure 8:
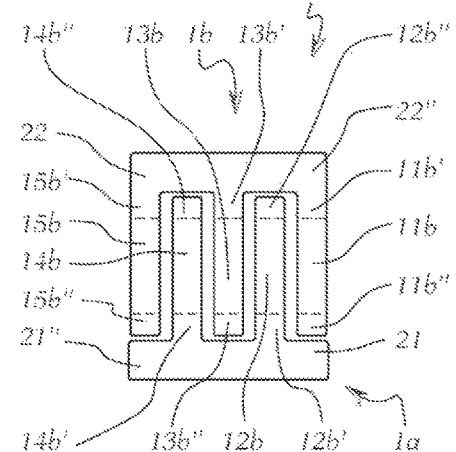

The invention will be explained in greater detail hereinafter with reference to the drawing, in which FIG. 1 shows a perspective view of an optical body which is fastened by means of a mounting device according to the invention in relation to a support for light sources, FIG. 2 shows the arrangement from FIG. 1, viewed from a different perspective, in an exploded illustration, FIG. 3 shows the arrangement from FIG. 1 in a view from the front, against the light exit direction, FIG. 4 shows a section along the line A-A from FIG. 3, FIG. 5 shows an exemplary optical body, as is used in the shown embodiment, in a perspective oblique view from behind, FIG. 6 shows a perspective view of an arrangement from FIG. 1, showing the main body with removed optical body, FIG. 7 shows a retaining body for fixing the optical body on the main body in a view from the front, and FIG. 8 shows the optical body from FIG. 5 in a view from the front.

FIG. 1 shows in the assembled state, and FIG. 2 shows in an exploded illustration a mounting device 100 for an optical body 1 for a motor vehicle headlight or for a light module for a motor vehicle headlight.

The optical body 1, which in particular can be clearly seen in FIGS. 2, 5, 6 and 8, comprises a number of ancillary optical systems 11, 12, 13, 14, 15 arranged adjacently side by side, wherein each ancillary optical system 11-15 is formed from a light-guiding material and each ancillary optical system 11-15 has a light coupling-in face 11*a*-15*a* (FIG. 5) and a light decoupling face 11*b*-15*b*.

The light decoupling faces 11*b*-15*b* of adjacent ancillary optical systems 11-15 here are arranged at a distance a>0 from one another, and, as illustrated, adjacent ancillary optical systems are generally distanced from one another over their entire extent and not only in the region of the light decoupling faces in order to prevent a passing of light from one ancillary optical system into an adjacent ancillary optical system.

This optical body 1, as can be seen in FIG. 2, is fastened to a support 200 for light sources 2, wherein one or more light sources feeds/feed light into a respective ancillary optical system, which light exits via the light decoupling faces 11*b*-15*b* and is projected, possibly by a downstream projection optics (not illustrated), in the form of a segmented light distribution into a region in front of a vehicle in which the optical body is installed. An overall light distribution is generated by means of a plurality of optical bodies, which are part of one or more light modules or of a vehicle headlight. No details are provided at this juncture, since the generation of an overall light distribution of this type constitutes known prior art for a person skilled in the art.

The ancillary optical systems 11-15 are mechanically interconnected in the region of the light decoupling faces 11*b*-15*b* by two connecting webs 21, 22 extending transversely to the ancillary optical systems 11-15. These connecting webs 21, 22 are optically ineffective here, at least in regions.

The connecting webs 21, 22 are disposed here in the installed position of the optical body (i.e. of the light module or headlight containing the optical body in question) one in an upper and one in a lower region of the optical element 1.

The optical body or the optical element 1 can be manufactured from one piece. For manufacturing reasons, however, it may be particularly advantageous if the optical body 1 consists as shown of two separate optical components 1*a*, 1*b*, wherein each optical component 1*a*, 1*b* comprises two or more ancillary optical systems 11, 13, 15; 12, 14 (in the specific example two and three ancillary optical systems).

In the shown two-part optical body the ancillary optical systems 11-15 additionally have webs 11*b*', 12*b*', 13*b*', 14*b*', 15*b*', 11*b*'', 12*b*'', 13*b*'', 14*b*'', 15*b*'', which extend the light decoupling faces 11*b*-15*b* of the ancillary optical systems 11-15. (The delimitation of the webs 11*b*', 15*b*'' relative to the light decoupling faces 11*b*-15*b* is illustrated in FIGS. 3 and 8 by a dot-and-dash line.)

Each ancillary optical system 11, 12, 13, 14, 15 here has a web 11*b*', 12*b*', 13*b*', 14*b*', 15*b*', which web 11*b*', 12*b*', 13*b*', 14*b*', 15*b*' connects the ancillary optical system 11-15 to the connecting web 21, 22 assigned to the ancillary optical system.

In addition, each ancillary optical system has a web 11*b*'', 12*b*'', 13*b*'', 14*b*'', 15*b*'', which web 11*b*'', 12*b*'', 13*b*'', 14*b*'', 15*b*'' is arranged in a region of the light decoupling face 11*b*, 12*b*, 13*b*, 14*b*, 15*b* facing a way from the connecting web 21, 22 connecting the ancillary optical system 11-15 to other ancillary optical systems 11-15.

In order to fasten this optical body 1 to the support, a mounting device 100 is provided in accordance with the invention, which comprises a main body 101, which can be connected to the support 200. Here, the shown main body 101, as already described, has receptacles 111, 112, 113, 114, 115 to the ancillary optical systems 11-15 of the optical body 1, and in particular the main body 101 also has two stop regions 121, 122, with which the optical body 1 can be brought into contact via rear faces 21', 22' of the connecting webs 21, 22 when the ancillary optical systems 11-15 are inserted into the receptacles 111, 112, 113, 114, 115. The stop regions 121, 122, which are adapted in terms of their shape and size to the connecting webs 21, 22, can be clearly seen in FIG. 2 and FIG. 6.

The mounting device 100 has a retaining body 102, which, following the introduction of the optical body 1 into the main body 101, can be applied to the main body 101 in the direction of introduction of the optical body 1 (i.e. substantially against the light exit direction). A fastening device 101*a*, 102*a* is also provided, by means of which the retaining body 102 can be fixed to the main body 101.

In the shown example the fastening device comprises detent elements 102*a* and corresponding detent recesses 101*a*, wherein the detent elements 102*a* are arranged on the retaining body 102 and the corresponding detent recesses 101*a* are arranged on the main body 101. The main body and retaining body can in this way be connected to one another in a stable manner, such that the ancillary optical system is also held in a stable manner in the desired position.

As can be inferred from FIG. 2 and FIG. 7, the retaining body 102 here has an opening 102', such that light can exit unhindered from the light decoupling faces 11*b*-15*b* of the ancillary optical systems 11-15.

The retaining body 102 has clamping elements 102*b* which, when the retaining body 102 is fastened to the main body 101 (FIG. 1, FIG. 3, FIG. 4; FIG. 7 shows merely the retaining body in a view from the front), come to rest against the connecting webs 21, 22 on the front faces 21'', 22'' thereof.

Furthermore, the retaining body 102 has clamping elements 102*c* which, when the retaining body 102 is fastened to the main body 101, come to rest against one or more light decoupling faces or preferably, as shown, in a region of the light decoupling faces 11*b*-15*b* of the ancillary optical systems 11-15.

The "regions" 12*b*'', 14*b*'', 13*b*'' of the light decoupling faces in the shown example are some of the above-described webs, which extend the light decoupling faces. Here, these are preferably the free webs, which are not connected to a connecting web.

The clamping elements 102b, 102c press the optical body 1 against the stop regions 121, 122 of the main body 101, for which purpose the clamping elements 102b, 102c are preferably resilient, in particular spring-loaded.

The stop regions 121, 122 and the clamping elements 102b rest here against regions of the rear 21', 22' and front 21", 22" faces, respectively, of the connecting webs 21, 22 that delimit an optically ineffective region, i.e. an optically ineffective volume of the connecting web 21, 22 in question.

Here, the connecting webs 21, 22 are preferably optically ineffective as a whole.

In principle, the connecting web and the ancillary optical systems can be manufactured from different materials, such that the connecting web or the connecting webs is/are manufactured from an optically ineffective, for example from a non-transparent material and therefore does/do not contribute to the optical function of the optical body. However, the connecting web(s) and ancillary optical systems are usually manufactured from one material, generally even in one piece (see the explanations in this regard further below), such that the connecting web or connecting webs also consists/consist of a light-guiding material. By means of a suitable selection of the position of a connecting web, for example such that this is arranged at a sufficient distance from the light exit faces of the ancillary optical systems, it can be provided that only a little light or no light passes into the connecting web or only into a region directly adjoining the light decoupling face(s), such that no light (or only an irrelevant amount) exits from the connecting web or exits only from a small region, such that the connecting web is completely or largely optically ineffective, i.e. does not contribute to the light distribution and also does not generate any negative optical effects, such as scattered light for example.

In order to reliably ensure that the connecting webs are contacted only in an optically ineffective region and also in order to enable parts of the optical body to be pressed against the main body uniformly and over the greatest possible area, the clamping elements 102b which, when the retaining body 102 is fastened to the main body 101, come to rest against the connecting webs 21, 22 at the front faces 21", 22" thereof advantageously come to rest in outer regions in respect of a longitudinal extension of the connecting webs 21, 22, preferably in both outer regions, as can be clearly seen in FIGS. 1, 3 and 7.

The "longitudinal extension" extends here in the installed position typically transversely, i.e. in the horizontal direction.

If the optical body is provided in plan view as a square, each corner is thus occupied by a clamping element 102b.

Those clamping elements 102c which do not contact the optical body in the region of the transverse webs, but in the region of the light decoupling faces 11b-15b come to rest against the free webs 13b", 12b", 14b", which extend the light decoupling faces 13b, 12b, 14b, more specifically against the middle three webs.

The webs are used on the one hand to extend the light exit faces of the ancillary optical systems, in order to improve the light distribution, and on the other hand in part to connect the ancillary optical systems to the connecting webs. The webs are therefore still optically effective above all directly adjacently of the ancillary optical systems, whereas they become optically ineffective with increasing distance, such that clamping elements can be contacted there without impairment of the optical function.

Is therefore advantageous in particular in this context if the clamping elements 102c come to rest in a region of the web 12b", 13b", 14b" facing away from the corresponding light decoupling face 11-15b. Regions of the web that are arranged further away are reliably optically ineffective, and therefore a touching of the clamping elements there is not critical.

In particular in the case of two-part or multi-part optical bodies, this allows the individual components of the optical body to be held uniformly and in a stable manner, since the individual component parts which "form" the optical body are then held in regions facing away from one another.

A two-part or multi-part optical body is to be understood here in terms of its function as "an" optical body generating a defined light distribution. An optical body of this type, however, actually consists of two or more parts, which are arranged in fixed, defined positions relative to one another by means of the retaining device, such that the function of "an" optical body is provided.

As already mentioned, the optical body or the separate components forming the optical bodies are pressed against the main body 101 by the retaining element 102, such that a movement in or against the light exit direction is no longer possible. The pressing force may be sufficiently high here that a lateral (horizontally, normal to the light exit direction) and a vertical displacement are also prevented.

Should the pressing force be insufficient, or in order to provide additional security against a lateral and/or vertical displacement of the optical body, the receptacles 111, 112, 113, 114, 115 in the installed position may additionally also form a stop for the ancillary optical systems 11-15 on one side or preferably on both sides and/or upwardly and/or downwardly.

At this juncture, the stop regions 121, 122 of the main body 101 may also alternatively or additionally be delimited by delimiting walls 101' protruding beyond the stop regions 121, 122.

These delimiting walls 101', which surround the two stop regions 121, 122, can serve as a stop for the optical body 1 upwardly and downwardly. A function as a stop region laterally is also possible. A lateral movement in the plane of the light exit faces is thus also reliably prevented.

However, a lateral displacement is usually prevented by the receptacles for the ancillary optical systems.

The invention claimed is:

1. A lighting device in the form of a light module for a motor vehicle headlight or in the form of a motor vehicle headlight, the lighting device comprising:
   at least one optical body (1), which has a number of adjacently arranged ancillary optical systems (11, 12, 13, 14, 15), wherein each ancillary optical system (11-15) is formed from a light-guiding material and each ancillary optical system (11-15) has a light coupling-in face (11a-15a) and a light decoupling face (11b-15b), wherein the ancillary optical systems (11-15) are mechanically interconnected in the region of the light decoupling faces (11b-15b) by at least one connecting web (21, 22) extending transversely to the ancillary optical systems (11-15); and
   a mounting device (100) for the at least one optical body (1) which comprises
   a main body (101), which is configured to be connected to a support (200) for one or more light sources (2) for feeding light into the at least one optical body (1), wherein the main body (101) has (i) at least one receptacle (111, 112, 113, 114, 115) for the ancillary optical systems (11-15), and (ii) at least one stop region (121, 122), with which the at least one optical body (1) is configured to be brought into abutment via a rear face (21', 22') of the at least one connecting web (21, 22) when the ancillary optical systems (11-15) are inserted into the at least one receptacle (111, 112, 113, 114, 115), wherein the at least one connecting web (21, 22) is optically ineffective, at least in some regions, a retaining body (102), which, once the at least one optical body (1) has been introduced into the main body (101), is configured to be applied to the main body (101) in the direction of introduction of the at least one optical body (1), and a fastening device (101a, 102a) by means of which the retaining body (102) is configured to be fixed to the main body (101), wherein:

the retaining body (102) has at least one opening (102'), such that light exits unhindered from the light decoupling faces (11b-15b) of the ancillary optical systems (11-15), the retaining body (102) has first clamping elements (102b) which, when the retaining body (102) is fastened to the main body (101), come to rest against the at least one connecting web (21, 22) on a front face thereof (21", 22"), one or more of the ancillary optical systems (11-15) comprise webs (11b''', 12b''', 13b''', 14b''', 15b'''), which extend the light decoupling faces (11b-15b) of the ancillary optical systems (11-15), wherein each web (11b''', 12b''', 13b''', 14b''', 15b''') is arranged in a region of the light decoupling face (11b, 12b, 13b, 14b, 15b) opposite and spaced apart from the at least one connecting web (21, 22) such that the light decoupling face (11b, 12b, 13b, 14b, 15b) is disposed between the webs (11b''', 12b''', 13b''', 14b''', 15b''') and the at least one connecting web (21, 22), the retaining body (102) has second clamping elements (102c) which, when the retaining body (102) is fastened to the main body (101), come to rest against the webs (11b''', 12b''', 13b''', 14b''', 15b''') on alternating sides of the at least one optical body (1) but do not contact the at least one connecting web (21, 22), and the first and second clamping elements (102b, 102c) press the at least one optical body (1) against the at least one stop region (121, 122) of the main body (101).

2. The lighting device of claim 1, wherein the first and second clamping elements (102b, 102c) are spring-loaded.

3. The lighting device of claim 1, wherein the at least one stop region (121, 122) and the first clamping elements (102b) rest against regions of the rear face and the front face (21', 22'), respectively, of the at least one connecting web (21, 22) that delimit the optically ineffective region of the at least one connecting web (21, 22).

4. The lighting device of claim 3, wherein the first clamping elements (102b) which, when the retaining body (102) is fastened to the main body (101), come to rest against the at least one connecting web (21, 22) on the front face (21", 22") thereof come to rest in at least one outer region with respect to a longitudinal extension of the at least one connecting web (21, 22).

5. The lighting device of claim 1, wherein the entire at least one connecting web (21, 22) is optically ineffective.

6. The lighting device of claim 1, wherein the at least one connecting web comprises two connecting webs (21, 22), one in an upper and one in a lower region of the at least one optical body (1) in the installed position.

7. The lighting device of claim 6, wherein the first clamping elements (102b) come to rest against an outer region of the two connecting webs (21, 22).

8. The lighting device of claim 1, wherein the light decoupling faces (11b-15b) of adjacent ancillary optical systems (11-15) are arranged at a distance a>0 from one another.

9. The lighting device of claim 1, wherein the at least one optical body (1) comprises at least two separate optical components (1a, 1b), wherein each optical component (1a, 1b) comprises at least one light-guiding body (11, 13, 15; 12, 14).

10. The lighting device of claim 9, wherein the optical components (1a, 1b) comprise precisely two optical components (1a, 1b).

11. The lighting device of claim 9, wherein at least one of the optical components (1a, 1b) comprises two or more light-guiding bodies (11, 13, 15; 12, 14).

12. The lighting device of claim 1, wherein the second clamping elements (102c) which, when the retaining body (102) is fastened to the main body (101), come to rest against the light decoupling face (11b-15b) come to rest in the region of the light decoupling face (11b-15b) bordering the at least one connecting web (21, 22).

13. The lighting device of claim 1, wherein each ancillary optical system (11, 12, 13, 14, 15) has at least one of the webs (11b', 12b', 13b', 14b', 15b'), which connects the ancillary optical system (11-15) to the at least one connecting web (21, 22).

14. The lighting device of claim 13, wherein each ancillary optical system has at least one of the webs (11b''', 12b''', 13b''', 14b''', 15b'''), which is arranged in the region of the light decoupling face (11b, 12b, 13b, 14b, 15b) facing away from the at least one connecting web (21, 22) connecting the ancillary optical system (11-15) to other ancillary optical systems (11-15).

15. The lighting device of claim 13, wherein the second clamping elements (102c) which, when the retaining body (102) is fastened to the main body (101), come to rest in the region of one or more light decoupling faces (11b-15b) of the one or more ancillary optical system(s) (11-15) come to rest against the webs (11b', 12b', 13b', 14b', 15b', 11b''', 12b''', 13b''', 14b''', 15b''') extending the light decoupling faces (11b-15b) of the ancillary optical systems (11-15).

16. The lighting device of claim 15, wherein the second clamping elements (102c) come to rest in a region of the web (11b', 12b', 13b', 14b', 15b', 11b''', 12b''', 13b''', 14b''', 15b''') facing away from the associated light decoupling face (11b-15b).

17. The lighting device of claim 15, wherein the second clamping elements (102c) come to rest against the webs (12b''', 13b''', 14b'''), which form an open end of the ancillary optical systems (12, 13, 14).

18. The lighting device of claim 1, wherein the fastening device comprises detent elements (102a) and corresponding detent recesses (101a), wherein the detent elements (102a) are arranged on at least one of the retaining body (102) and the main body (101), and the corresponding detent recesses (101a) are arranged on at least the other of the main body (101) and the retaining body (102).

19. The lighting device of claim 1, wherein the main body (101) has at least one receptacle (111, 112, 113, 114, 115) for each ancillary optical system (11, 12, 13, 14, 15).

20. The lighting device of claim 1, wherein the at least one receptacle (111, 112, 113, 114, 115) in the installed position forms a stop for the ancillary optical systems (11-15) on at least one side to prevent displacement in at least one of an upward direction and a downward direction.

21. The lighting device of claim 1, wherein the at least one stop region (121, 122) of the main body (101) is delimited on at least one one side in at least one of an upper region and a lower region by delimiting walls (101') protruding in the light exit direction beyond the at least one stop region (121, 122).

22. A lighting device of claim 1, which is in the form of a motor vehicle headlight for generating a dynamic light distribution array.

* * * * *